United States Patent
Deperini

(10) Patent No.: US 11,197,241 B2
(45) Date of Patent: Dec. 7, 2021

(54) FAST ENERGY COUNTER FOR WIRELESS COMMUNICATION TRANSCEIVER

(71) Applicant: Telit Communications S.p.A., Sgonico (IT)

(72) Inventor: Fabio Deperini, Udine (IT)

(73) Assignee: TELIT COMMUNICATIONS S.P.A., Trieste (IT)

( * ) Notice: Subject to any disclaimer, the term of this patent is extended or adjusted under 35 U.S.C. 154(b) by 100 days.

(21) Appl. No.: 16/764,321

(22) PCT Filed: Nov. 16, 2018

(86) PCT No.: PCT/EP2018/081504
§ 371 (c)(1),
(2) Date: May 14, 2020

(87) PCT Pub. No.: WO2019/096968
PCT Pub. Date: May 23, 2019

(65) Prior Publication Data
US 2020/0374798 A1    Nov. 26, 2020

Related U.S. Application Data

(60) Provisional application No. 62/587,670, filed on Nov. 17, 2017.

(51) Int. Cl.
*H04W 40/10* (2009.01)
*H04W 52/02* (2009.01)
*H04W 24/08* (2009.01)

(52) U.S. Cl.
CPC ....... *H04W 52/0209* (2013.01); *H04W 24/08* (2013.01)

(58) Field of Classification Search
CPC ............. H04W 52/0235; H04W 40/10; H04W 52/246; H04W 72/0406; H04L 67/125; H04L 12/2807; G01S 19/34; G08C 17/02
See application file for complete search history.

(56) References Cited

U.S. PATENT DOCUMENTS

| | | | |
|---|---|---|---|
| 2004/0092281 A1* | 5/2004 | Burchfiel | H04B 7/0408 455/522 |
| 2008/0070520 A1* | 3/2008 | Mitter | H03F 3/24 455/127.2 |
| 2014/0201556 A1 | 7/2014 | Attar | |
| 2016/0262105 A1 | 9/2016 | Tomisawa | |

* cited by examiner

*Primary Examiner* — Tu X Nguyen
(74) *Attorney, Agent, or Firm* — Pearl Cohen Zedek Latzer Baratz LLP

(57) ABSTRACT

A device, system and method is provided for managing battery power of a telecommunications device within a remote wireless device. An amount of power is determined that is consumed by the telecommunications device of the remote wireless device during an operation of the telecommunication device based on a linear function of an exponential of a power level measuring a radio frequency (RF) power output by the telecommunications device utilized during operation one or more parameters associated with the remote device, and an amount of time that each power level is utilized during operation. The determined amount of power consumed by the telecommunications device, or a derivation thereof, may be wirelessly transmitted to a wirelessly connected device.

20 Claims, 5 Drawing Sheets

FAST ENERGY COUNTER FOR WIRELESS COMMUNICATION TRANSCEIVER

CROSS-REFERENCE TO RELATED APPLICATIONS

This application is a National Phase Application of PCT International Application No. PCT/EP2018/081504, entitled "FAST ENERGY COUNTER FOR WIRELESS COMMUNICATION TRANSCEIVER", International Filing Date Nov. 16, 2018, published on May 23, 2019 as International Publication No. WO 2019/096968, which in turn claims priority from U.S. Provisional Patent Application No. 62/587,670, filed Nov. 17, 2017, all of which are incorporated herein by reference in their entirety.

FIELD OF THE INVENTION

Embodiments of the invention relate to the field of wireless communication transceivers, and, in particular, to monitoring power consumed by wireless communication transceivers transmitting or receiving over a telecommunication network. Some embodiments relate to the use of wireless communication transceivers to connect a network of devices in an Internet of Things ("IoT") system.

BACKGROUND OF THE INVENTION

"Internet of Things" (IoT) is an inter-connected network of communication devices (e.g., "smart" devices) with electronics, sensors, software and network connectivity. IoT communication devices may be deployed to monitor technical devices, such as, automobiles, security systems, medical devices including biological implants, home appliances, etc. IoT devices may measure and/or gather data about the environment in which they are deployed. An IoT communication device may have a telecommunication transceiver or modem which allows the IoT communication device to transmit and/or receive data to/from a monitoring device over a wireless network, such as the Internet. IoT devices are often wireless and require management of a power source, such as, a rechargeable battery or a replaceable disposable battery.

The telecommunication transceiver may draw power from the power source of IoT device itself. The amount of energy consumed by the telecommunication module during wireless communication may be monitored in order to accurately track the battery life, ensure timely recharging of the rechargeable battery or replacement of the disposable battery, and guarantee that a transmission can be completed with the remaining charge in the battery (e.g., cancelling a transmission if the charge available is not enough to complete the task).

The conventional method of keeping track of the consumed energy is the insertion of a specialized battery fuel gauge integrated circuit (IC). This solution however adds dedicated hardware that occupies extra space, making the IoT device larger (when the goal of IoT design is generally to decrease size) and uses more power to operate the dedicated battery fuel gauge IC.

Accordingly, there is a need in the art to quickly and accurately determine the amount of energy consumed by a telecommunications transceiver during transmission.

SUMMARY OF THE INVENTION

According to some embodiments of the present invention, there is provided a method and system for managing battery power of a telecommunications device within a remote wireless device, and a telecommunications device which can manage its battery power. An amount of power consumed by the telecommunications device during operation may be determined based on a linear function of: an exponential of a power level measuring a radio frequency (RF) power output by the telecommunications device utilized during operation; one or more parameters associated with the remote device; and an amount of time that each power level is utilized during operation.

The power level may be a power control level received from a base station over a control channel, the power level may be incremented or decremented as directed by the network to increase or decrease the power level in fixed increments, or the power level may be adjusted in response to a command for coarse power adjustment and a command for fine power adjustment received from the network.

The power consumption may be determined based on a product of the exponential power level corresponding to the power level utilized by the remote device during operation, the parameters, and the amount of time or number of time intervals that each power level is utilized by the remote device during operation. The power consumption may be determined based on the product multiplied by a scaling factor and summed with a constant biasing factor.

In some embodiments of the invention, a plurality of exponential power levels or derivations thereof for each corresponding one of a plurality of respective available power levels of the telecommunications device may be stored in a look-up table. The amount of power consumed by the telecommunications device may be determined by looking up the exponential power level in the look-up table that corresponds to the power level utilized during operation.

In some embodiments of the invention, the amount of power consumed by the telecommunications device is determined during only transmission times, during both transmission and reception times, during transmission, reception and idle times, or during transmission, reception, idle and power save times.

The determined amount of power consumed by the telecommunications device or a derivation thereof may be wirelessly transmitted to a wirelessly connected device.

If the amount of power consumed by the telecommunications device crosses a threshold, the power output of the remote device may be adjusted. The battery level reading associated with the telecommunications device may be updated by decrementing a current value of the battery level by an amount based on the determined amount of power consumed by the telecommunications device.

BRIEF DESCRIPTION OF THE DRAWINGS

The foregoing and other objects, features, and advantages of the present invention, as well as the invention itself, is more fully understood from the following description of various embodiments, when read together with the accompanying drawings.

DETAILED DESCRIPTION OF THE INVENTION

Figure 1:
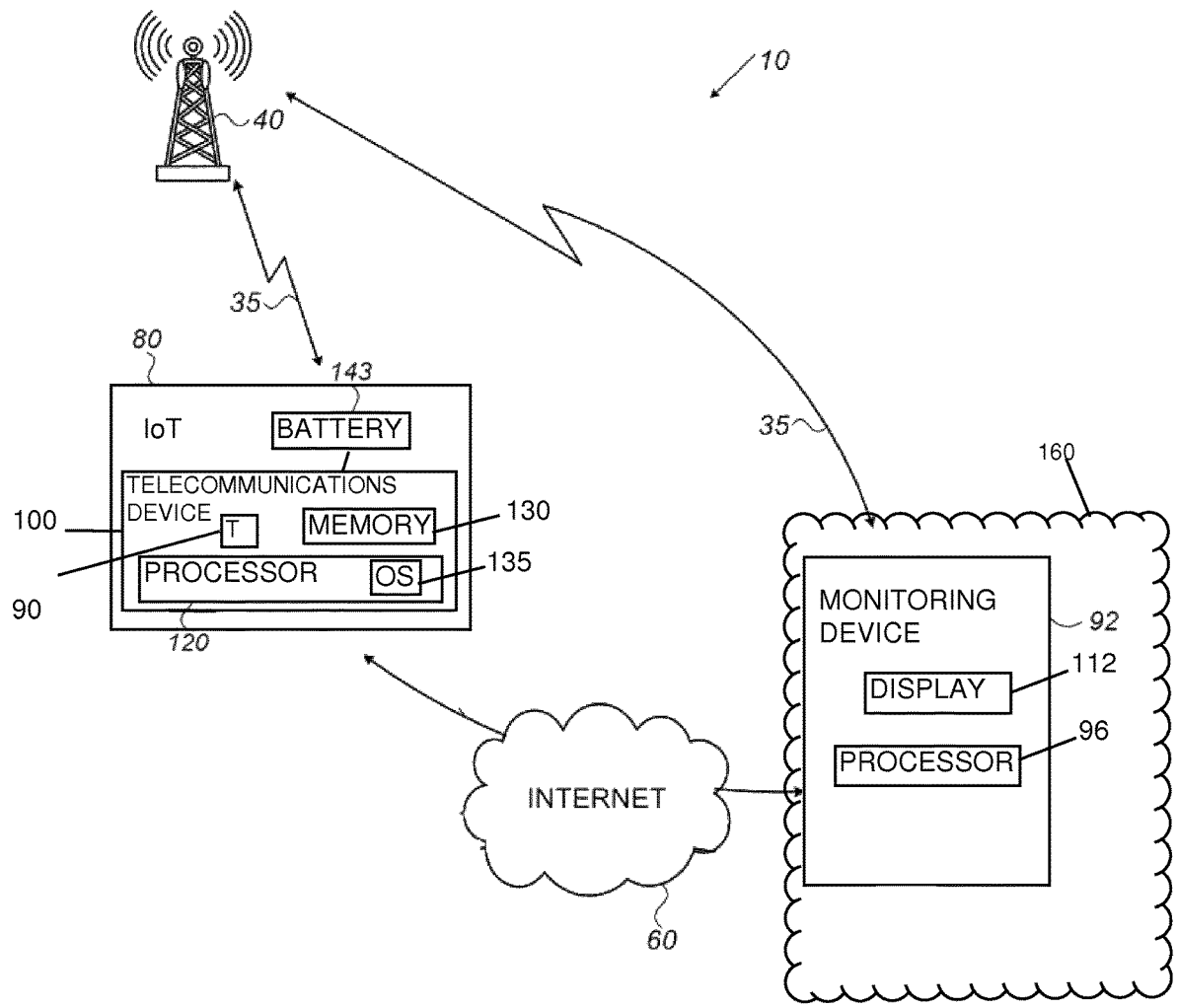
FIG. 1 schematically illustrates a system for a fast energy counter for a wireless telecommunications device, according to an embodiment of the invention.

Embodiments of the invention provides a fast and efficient energy counter to accurately estimate the energy consumed by a telecommunications transceiver based on the radio frequency (RF) power output by the telecommunications transceiver during transmission, reception, idle and/or other modes. The energy counter may be implemented as software or instructions executable by one or more processors in a dedicated telecommunications module or IoT device.

Energy consumed by the telecommunications transceiver may be determined by integrating the power consumption over time, for example, as follows:

$$E = \int P(t)dt = \int V(t)*I(t)dt \quad (1)$$

where E is consumed energy, P(t) is the power at time t, dt is an incremental change in time, V(t) is the voltage at time t, and I(t) is the current at time t.

In other words, energy is equal to the integral of power over the duration of time measured, or energy is equal to the integral of the product of voltage and current over the duration of time measured. Considering that generally electronics are operated at constant voltage, the energy equation may be simplified, for example, as follows:

$$E = \int V*I(t)dt = V\int I(t)dt \quad (2)$$

Power consumed (energy) can thus be evaluated by integrating the current consumption over time and then multiply the result for the (constant) voltage at which the device is operating. However, numerical integration of variables such as current consumption, e.g., derived from the known transmission power level, is typically complex and time-consuming (e.g., solving many terms of a Taylor transform or another numerical series).

Embodiments of the invention simplify these calculations by performing different computations based on different "consumption states" of the transceiver, such as transmitting, receiving, and/or idle states. In each state, the power consumption is typically constant over time. Under such a condition the integral of equation (2) may be simplified as a sum of different consumption states (i):

$$E = V*\int_0^T I(t)dt = V*\Sigma_{i=1}^n I_i*T_i \quad (3)$$

In particular, for a transceiver, the consumption states (i) may be, for example:
Transmission
Reception
Idle
Any additional states (e.g., low power, standby, etc.) may be used, and one or more of these states (e.g., idle) may be omitted or two or more states can coexist at the same time (e.g., reception and transmission).

In the above example, the transceiver may operate in each of the three consumption states for an integer number of fixed time slots (e.g., GSM timeslot for a second generation (2G) device). The power consumption may be simplified as:

$$E = V*\Sigma_{i=1}^N (TX_{current_i}*T_S + RX_{current_i}*T_S + Idle_{current_i}*T_S) \quad (4)$$

where $TX_{current_i}$ is the current consumption during the transmission period (generally the greatest contribution of the three states), $RX_{current_i}$ is the current consumption during the reception period, $Idle_{current_i}$ is the current during the idling period, $T_s$ is the timeslot duration time.

While the radio frequency power level (e.g., measured in dBm) is typically known to the IoT device (radio frequency power levels are generally controlled or assigned by the network), the associated current consumption is generally not known. The current consumption may be calculated as a function of the RF power level, f(Power level$_i$), for example, as follows:

$$E = V*\{\Sigma_{i=1}^N f(\text{Power level}_i)*T_S + RX_{current_i}*T_S + Idle_{current_i}*T_S)\} \quad (5)$$

The relationship between power level and current is non-linear and this non-linear computation is further complicated because the RF power level can change continuously. As the transceiver's power consumption changes continuously, these complex and time-consuming calculations may not be computed as fast as the RF power level changes during normal operation, and are thus too slow to measure energy in real-time. Further, sending the power level information locally to a IoT microprocessor is not feasible, because increasing the transfer load will increase the CPU load and consumption and cause a surge in CPU activity that may clog both the microcontroller and the modem. For these reasons, conventional systems generally do not compute the instant power consumption continuously or at each time, but an aggregate of power consumption averaged over a period of time to reduce the number of readings and associated computations.

In some systems, the transceiver or IoT device may not have the native processing resources or battery life to perform the power consumption calculations locally, and instead, transmits raw power level (e.g., RF output) readings to a remote centralized server to compute the power output at the server-side. Remote handling, however, causes delays due to transmitting data across a network and, in addition, wastes network bandwidth that might otherwise be avoided were the device able to compute energy locally.

Embodiments of the invention solves the aforementioned problems in the art by computing power consumption of a transceiver based on a linear function of an exponential of a power level measuring a radio frequency (RF) power output by the transceiver during transmission. Compared to conventional non-linear approximations, utilizing a linear function to determine power consumption is faster and more efficient. Simplifying the calculations needed to determine energy consumption during transmission may result in reduction in the processing power, processing time, and power consumption of a device making this determination.

Some embodiments of the present invention solve the problem of slow, complex, and/or inaccurate power consumption computations by indexing the power consumption to $10^{Power\ Level}$ instead of to the internally known Power level (in 2G) or power output level (in 3G/4G, used to comply with the maximum allowed uplink (UL) transmission (Tx) Power).

With this arrangement, embodiments of the invention linearize the relationship between current consumption and RF power output, for example, as follows:

$$TX_{current_i} = (\alpha + \beta * 10^{Power\ Level_i}) \qquad (6)$$

where $\alpha$ and $\beta$ are device parameters (e.g., depending on the IoT device, the transceiver, the antenna, etc.), and Power Level is the power level of the RF signal output by the transceiver during transmission (e.g., measured in decibel-milliwatts (dBm)).

Thus, equation (5) may be rewritten, for example, as follows:

$$E = V*\{\Sigma_{i=1}^{N}(\alpha+\beta*10^{Power\ Level_i})*T_S + RX_{current_i}*T_S + Idle_{current_i}*T_S)\} \text{ or}$$

$$E = V*T_s*((M*RX_{current})+(O*Idle_{current})+[N*\alpha + (\beta\Sigma_{i=1}^{N} 10^{Power\ Level_i})]) \qquad (7)$$

where N is the number of timeslots or subframes in transmission mode, M is the number of timeslots or subframes in receiver mode, O is the number of timeslots or subframes in idle mode, and $T_s$ is the timeslot or subframe duration. The term $\Sigma_{i=1}^{N} 10^{Power\ Level_i}$ may be computed by the transceiver, e.g., based on the value for the term $10^{Power\ Level}$ retrieved by from a lookup table that stores a correspondence between the different Power levels and values of $10^{Power\ Level}$.

Linearizing power consumption calculations may result in a reduction in processing power, processing time, and power consumption for the device to perform the linear power consumption calculations, compared to conventional non-linear calculations. Furthermore, having linearized the relationship between power consumption and RF output power, embodiments of the invention can take advantage of the distributive property to scale the function for different device parameters, which greatly simplifies the calculations. In some embodiments of the invention, in order to scale the power consumption for different antennas and/or RF power amplifiers, only device parameters $\alpha$ and $\beta$ may be adjusted. Because the remaining term $\Sigma_{i=1}^{N} 10^{Power\ Level_i}$ does not change, the computation may be adjusted by a simple multiplication. Conversely, if given a lookup table with the current consumption under certain conditions, the following term may be provided:

$$\Sigma_{i=1}^{N}(TX_{current_i}) = \Sigma_{i=1}^{N}(\alpha+\beta*10^{Power\ Level_i}) \qquad (8)$$

and $\alpha$ and $\beta$ may be derived to reverse the relationship in equation (6), and calculate a new scaled consumption for the actual conditions, e.g., as: $\Sigma_{i=1}^{N}(\alpha'+\beta'*10^{Power\ Level_i})$. If the $10^{Power\ Level_i}$ value were not utilized, this reverse relationship would need to be repeatedly calculated for each sample of $TX_{current_i}$ to scale it to $TX'_{current_i}$ which requires a great or prohibitive amount of processing.

In some embodiments of the invention, a lookup table may be provided that includes the relationship between current consumption and various conditions (e.g., $\alpha$ and $\beta$) in the transceiver. For example, the various conditions may include transmission at different power levels, use of different antennas which influence the current consumption, or differences in surrounding environments (e.g., types of batteries, wire configurations, printed circuit board ("PCB") and plastics used).

In some embodiments, the lookup table may omit a detected condition, in which case, the precise value of the current consumption of the unlisted condition may be generated by scaling the nearest consumption value based on (e.g., proportionality to) the difference between the corresponding nearest condition and the actual condition. In another embodiment of the invention, an end user may customize the look-up table to list all possible or relevant conditions. In some embodiments of the invention, the end user is only able to adjust the values of $\alpha$ and $\beta$ depending on the device used, rather than adjusting the values in the look-up table itself based on the device used.

In some embodiment, a device may compute a linear function of an exponential of a power level to determine the amount of power consumed during communication approximately instantaneously and/or sufficiently fast to determine the power consumption as fast as the power levels change to monitor power consumption in "real-time". Real-time power monitoring may allow the IoT device or transceiver to adjust power states (e.g., active mode, idle mode, power save mode) to reflect or account for the true and current power levels associated with the continuously adjusted communication power output, for example, without the delays associated with conventional non-linear computations.

The simplicity of the linear computations may obviate the need in conventional systems to aggregate or otherwise approximate power consumption, eliminating the associated inaccuracies. Reducing the processing requirements associated with the power consumption computations may also enable the transceiver or IoT device to calculate the power consumption locally at the device itself, rather than delegating the task to a remove server, thereby eliminating the problems of transmission delays and increased network traffic due to these transmissions. Reducing the processing requirements may also decrease the power consumed by performing these calculations and thereby extend the battery life of the IoT device.

In some embodiments, the present invention reduces processing requirements and reduces power consumption by numerically computing the term $10^{Power\ Level}$ once for each power level (e.g., before runtime), and storing the values for retrieval when that power level is in use (e.g., during runtime). The term may then be multiplied or scaled according to the aforementioned equations to compute the power level linearly and instantaneously (e.g., in the time is takes to multiply). Because the term $10^{Power\ Level}$ is only computed once for each power level and not during runtime, the term may be computed with very high accuracy (e.g., based on any number N of numerical expansion terms), as compared to conventional systems which compute a power function for every energy measurement during runtime. For example, $10^{Power\ Level}$ may be calculated up to at least the term $x^6$ in the Taylor series expansion, for example, of equation (9), which involves summing 6 multiplications, 5 divisions, and 6 sums which would be 18 floating point operations.

$$f(10^x) = 1 + (x*\ln 10) + \frac{(x*\ln 10)^2}{2!} + \frac{(x*\ln 10)^3}{3!} + \ldots + \frac{(x*\ln 10)^n}{n!} \qquad (9)$$

In some embodiments of the invention, a look-up table which includes the values for $10^{Power\ Level}$ for each available power level of the telecommunications device of the IoT device is utilized. Then, only 2 floating point operations may be used to calculate current consumption (e.g., multiplying the amount of time of transmission at a certain power level with the corresponding value for $10^{Power\ Level}$ for the power level) each time the current consumption is calculated.

To achieve comparable accuracy, conventional methods would perform 18 floating point operations to calculate power consumption according to equation (5) every time the current consumption is evaluated. Accordingly, the 2 floating point operations used to compute the same power consumption according to embodiments of the invention provides a reduction in the number of computations by a factor of nine, and a corresponding speed-up processing by a factor of nine.

Reference is made to FIG. 1, which schematically illustrates a system 10 for a fast energy counter for a wireless telecommunications device 100 of an IoT device 80, according to an embodiment of the invention.

The telecommunications device 100 may include a transceiver 90 for communicating with a monitoring device 92. Transceiver 90 may communicate with monitoring device 92 over a mobile telephone network 35 (via a mobile base station 40) and/or an internet protocol ("IP") network 60 (via ISP servers). In some embodiments of the invention, the monitoring may be performed by a cloud computing system 160, which may include one or more monitoring devices 92, such as remote servers, connected by a network 60.

The IoT device 80 may be, for example, a thermostat, a car, a pacemaker or any other primarily battery powered device that uses transceiver 90 to connect wirelessly to a network to transmit and/or receive data.

The IoT device 80 and/or telecommunications device 100 may include a battery 143. The telecommunications device 100 may include a processor 120 and a memory 130. The telecommunications device 100 may draw power from the battery 143. The battery 143 may be rechargeable or replaceable.

The memory 130 may include, for example, a read only memory ("ROM"), a random access memory ("RAM"), a dynamic RAM ("DRAM"), a flash memory, a volatile memory, a non-volatile memory, a cache memory, a buffer, or other suitable permanent, long-term or short-term memory units or storage units. The processor 120 may execute software residing in an operating system ("OS") 135 for calculating and/or transmitting an amount of energy consumed by the telecommunications device 100 during an operation such as transmission, reception, or idle.

Monitoring device 92 may include a processor 96 to process information transmitted by the telecommunications device 100, such as the amount of energy consumed by the telecommunications device 100 during the operation of the telecommunications device 100. The monitoring device 92 may be a cellular phone, a personal computer, desktop computer, mobile computer, laptop computer, and notebook computer or any other suitable device such as a personal digital assistant (PDA), video game console, etc.

The monitoring device 92 may transmit instructions to an IoT device 80, for example, to a car to start the ignition, or to a remote health monitoring to administer medicine. IoT device 80 may transmit information to monitoring device 92, such as, a temperature inside of the car or a heart rate of a patient. The IoT device 80 may compute and/or transmit information regarding an amount of power consumed, e.g., for transmitting and/or receiving data to/from monitoring device 92, for executing instructions from monitoring device 92, or a total amount of power depleted from or remaining in the battery 143.

The monitoring device 92 may include a display 112, for example, to display data received from IoT device 80, such as an amount of power consumed by the telecommunications device 100 and/or IoT device 80 together or separately. A user may operate the monitoring device 92 to observe and/or modify power management options of the telecommunications device 100 and/or IoT device 80 in order to conserve power of the battery 143.

The processor 120 may be configured to calculate an amount of energy consumed by the telecommunications device 100 during transmission based on a linear function of an exponential of a power level measuring a radio frequency ("RF") power output by the telecommunications device 100 utilized during operation, one or more parameters associated with the IoT device 80, and an amount of time (or equivalently number of time intervals) that each power level is utilized during operation.

In some embodiments of the invention, telecommunications device 100 may be configured to calculate an amount of energy consumed by the telecommunications device 100 during transmission based on a product of the exponential power level corresponding to the power level utilized by the IoT device 80 during operation, the parameters, and the amount of time or number of time intervals that each power level is utilized by the IoT device 80 during operation.

In some embodiments of the invention, the processor 120 and/or IoT device 80 may be configured to adjust power output of the IoT device 80 when the amount of power consumed by the telecommunications device 100 crosses a threshold.

In some embodiments of the invention, telecommunications device 100 may be configured to transmit instructions to the monitoring device 92 to update a battery level (e.g., the amount of power available for consumption in battery 143) by decrementing a current value of the battery level by an amount based on the determined amount of power consumed by the telecommunications device 100.

In some embodiments of the invention, the memory 130 may store a look-up table which includes a plurality of exponential power levels or derivations thereof for each corresponding one of a plurality of respective available power levels of the telecommunications device 100. The processor 120 may be configured to determine an amount of energy consumed by the transceiver 90 during transmission, reception and/or other modes by looking up the exponential power level in the look-up table that corresponds to the power level utilized during operation.

Figure 2:
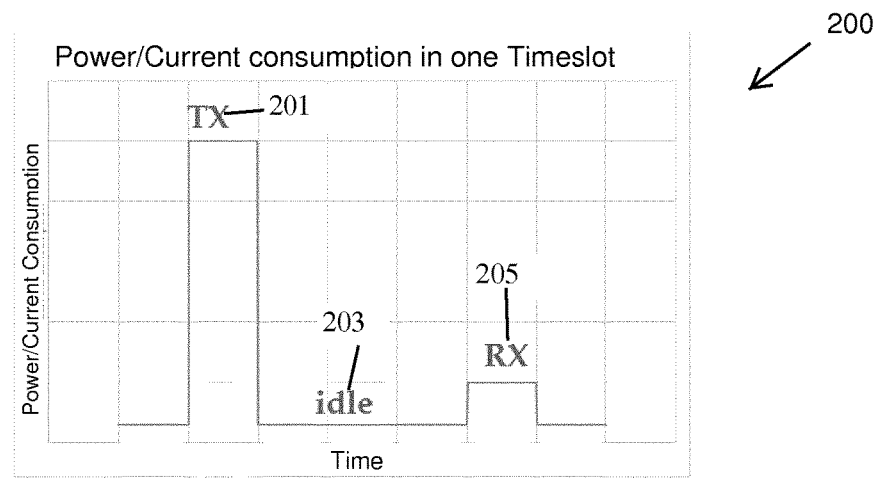
FIG. 2 is a graph of current consumption of a telecommunications device during transmitting, receiving, and idle modes, according to an embodiment of the invention.

Reference is made to FIG. 2, which is a graph 200 of current consumption of a telecommunications device (e.g., the telecommunications device 100 of FIG. 1) during transmission, reception, and idle modes, according to an embodiment of the invention. As shown in FIG. 2, the power required for transmission mode is typically significantly more than the power required for reception or idle modes.

In FIG. 2, the x-axis of the graph 200 represents time, which is divided into timeslots in which the telecommunications device operates in transmission mode 201, reception mode 205, and idle mode 203. The y-axis of the graph 200 represents power or current consumption of the transceiver (e.g., transceiver 90 of FIG. 1) (power being proportional to current when voltage is kept constant).

According to some embodiments, voltage is constant or may be approximated as a constant, not a variable value. Thus, power and current are directly proportional to each other, and may be treated interchangeably in the present application, transformed by a proportionality constant.

In other words, according to some embodiments, voltage may be considered a proportionality constant, and the relationship between current and power may be simplified to:

$$P \propto I \qquad (10)$$

where P is power, $\propto$ is a proportionality sign, and I is current. Because of the proportionality between power and current, the y-axis of FIGS. 2-5 may represent either power or current consumption.

While FIG. 2 depicts only one transmission 201, idle 203, or reception 205 during a single time frame, in General Packet Radio Service ("GPRS"), in 3G ("UMTS"), and in 4G ("LTE"), transmission or reception of data can happen in more than one time slot of a single time frame. For example, in 3G, there may be 15 time slots per time frame. In 4G, there may be 2 time slots per subframe, and 10 subframes per time frame.

In some embodiments of the invention, in 2G the preferred time unit may be the time slot, in 3G and 4G the preferred time unit may be the time slot of the frame/subframe, and in other systems the time unit(s) may differ.

Figure 3:
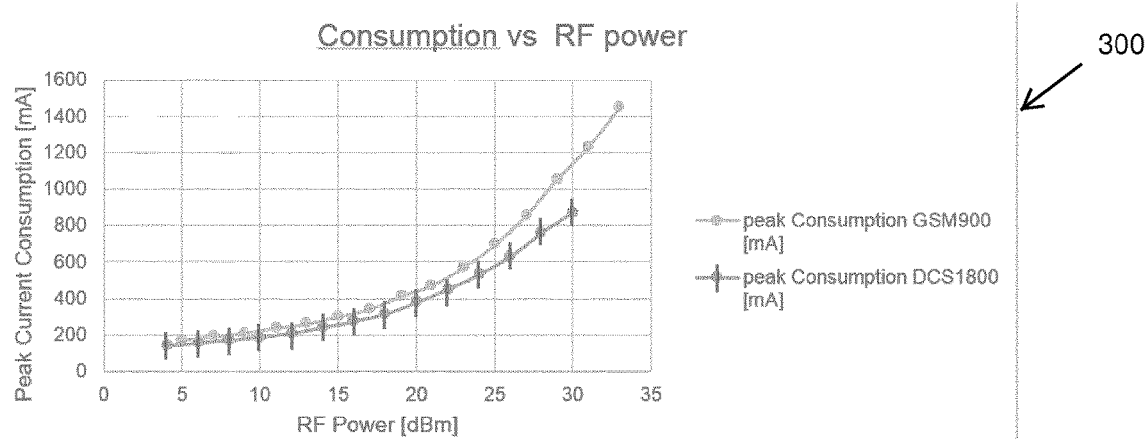
FIG. 3 is a graph of the relationship between peak current consumption and radio frequency ("RF") power when a telecommunications device is transmitting, according to an embodiment of the invention.

Reference is made to FIG. 3, which is a graph 300 of the relationship between peak current consumption and radio frequency ("RF") power when a telecommunications transceiver (e.g., transceiver 90 of FIG. 1) is transmitting, according to an embodiment of the invention.

FIG. 3 depicts an example relationship between peak current consumption to radio frequency ("RF") power for a telecommunications device utilizing a Global System for Mobile Communications ("GSM") 900 frequency band to transmit data, for a telecommunications device utilizing a Digital Communication System ("DCS") 1800 frequency band to transmit data.

The x-axis of FIG. 3 represents RF power in example units of decibel-milliwatts (dBm), and the y-axis of FIG. 3 represents peak current consumption in example units of milliamps (mA).

As shown in FIG. 3, the relationship between peak current (or power) consumption and RF power measured in dBm or dBW, during transmission, is not linear. Rather, peak current (or power) consumption increases exponentially as RF power increases.

The power may be expressed as follows:

$$10^{\frac{PL}{10}} = \frac{P}{1\,\text{mW}} \quad (11)$$

or $$P = \left(10^{\frac{PL}{10}}\right) \text{mW} \quad (12)$$

where PL is a power level measuring a RF power output by the telecommunications module during transmission measured in decibel-milliwatts (dBm), P is power, and mW is a milliwatt.

Equation (12) demonstrates that there is an ideally linear relationship between power consumption and $10^L$ (e.g., though in practice, the relationship may be approximately linear because the efficiency of the RF amplifier changes with the power output). Because power and current are proportional, there is also a roughly linear relationship between current consumption and $10^{PL}$.

Figure 4:
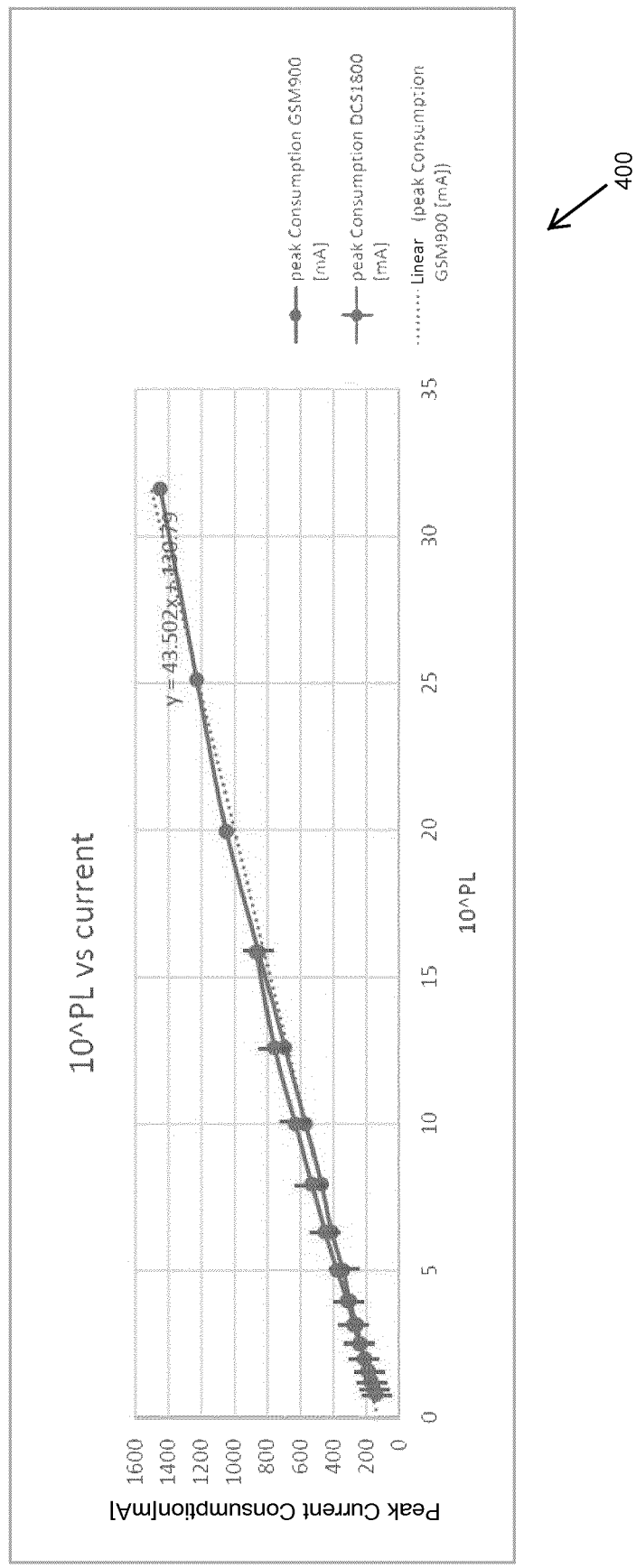
FIG. 4 is a graph of the relationship between peak current consumption and a power of 10 ($10^{PL}$) of a power level (PL) of RF power output by a telecommunications transceiver during transmission, according to an embodiment of the invention.

Reference is made to FIG. 4, which is a graph 400 of the relationship between peak current consumption and a power of 10 ($10^{PL}$) of a power level (PL) of RF power output by a telecommunications transceiver (e.g., transceiver 90 of FIG. 1) during transmission, according to an embodiment of the invention.

FIG. 4 depicts an example relationship between peak current consumption and $10^{PL}$ for a telecommunications device utilizing a Global System for Mobile Communications ("GSM") 900 frequency band to transmit data, for a telecommunications device utilizing a Digital Communication System ("DCS") 1800 frequency band to transmit data, and the dotted line is a linear interpolation of the peak current values.

Graph 400 linearizes the non-linear relationship of graph 300 by using an exponential or non-linear scale. A unit increment along the x-axis of graph 300 represents a linear increase or decrease in RF Power (PL), whereas an equivalent unit increment along the x-axis of graph 400 represents an exponential increase or decrease in RF Power ($10^{PL}$).

The relationship between peak current consumption and $10^{PL}$ may be generalized, for example, as:

$$I = \alpha + (\beta \cdot 10^{PL}) \quad (13)$$

where I is current, $\alpha$ and $\beta$ are parameters typical of the telecommunications device, and PL is a power level measuring a RF power output by the telecommunications module during transmission measured in decibel-milliwatts (dBm).

Because current consumption is proportional to power consumption, the relationship between peak power consumption and $10^{PL}$ may be expressed as:

$$P \propto \alpha + (\beta \cdot 10^{PL}) \quad (14)$$

where P is power, $\propto$ is a proportionality sign, $\alpha$ and $\beta$ are parameters typical of the telecommunications device, and PL is a power level measuring a RF power output by the telecommunications module during transmission measured in decibel-milliwatts (dBm).

Equation (11) may be manipulated to represent the relationship between charge and the current consumption during transmission, reception, and idle modes, for example, as follows:

$$q = \int_0^t I\,dt = \sum_1^N ([TX_{current_i} \cdot T_S] + [RX_{current_i} \cdot T_S] + [Idle_{current_i} \cdot T_S]) \quad (15)$$

where q is charge, $\int$ is an integration sign, t is time, I is current, dt is an incremental change in time, N is a real number representing a number of time units (timeslots or subframes, for example) occurring between 0 seconds and t, $TX_{current}$ represents the amount of current consumed during transmission, $RX_{current}$ represents the amount of current consumed during reception, $Idle_{current}$ represents the amount of current consumed during idling, i represents an index of summation which is incremented from i=1, ..., N, $\Sigma$ is a summation sign, and $T_S$ is the time unit duration (e.g., in GSM, the time unit duration is a timeslot of 570 μs).

As shown in FIG. 2, the amount of current consumed during reception and idle timeslots may be below threshold or negligible when compared to the amount of current consumed during transmission timeslots. Accordingly, equation (15) may be approximated based only on current consumed during transmission timeslots:

$$q = \sum_1^N (TX_{current_i} \cdot T_S) \quad (16)$$

Equation (13) may then be used to manipulate equation (16) as follows:

$$q = T_S \cdot \sum_1^N (\alpha + (\beta \cdot 10^{PL})) = (T_S \cdot \alpha \cdot N) + (T_S \cdot \beta \cdot \sum_{i=1}^N 10^{PL}) \quad (17)$$

where $\sum_{i=1}^N 10^{PL}$ is a weighted sum of the power level (PL) measuring a RF power output by the telecommunications module during transmission.

$\sum_{i=1}^N 10^{PL}$ may be referred to as an exponential weighted sum of the power level (EPCL) measuring a RF power output by the transceiver during transmission.

One example equation for the EPCL of a telecommunications device utilizing the GSM900 or GSM850 frequency band may be:

$$EPCL = 10^{\left(\frac{5-PCL}{10}\right)} \quad (18)$$

where PCL is the power level according to the ETSI (European Telecommunications Standards Institute) Power Control Level specification in 3GPP TS 05.05 v.8.20.0 par. 4.1.1.

Values for α and β may be determined by fixing the EPCL fitting curve to best fit the consumption curve. For example, in GSM900, the value for EPCL may be set to 1.0 for full power (PCL=5) to approximate the values of the α and β parameters. As a "raw" initial estimation (e.g., with a reasonable error), α may be the value of the current consumption at the minimum power control level 19 and β may be the current consumption at the maximum power minus α (because at that power EPCL=1). Accuracy may be improved by fitting the EPCL curve more closely to the consumption curve by solving a linear interpolation thereof; however, a "raw" initial estimation also provides reasonable accuracy.

There are 19 power levels for GSM 900/850 and 15 power levels DCS1800/PCS1900 specified by the ETSI specifications, so EPCLs for all power levels may be stored in a relatively small storage space (e.g., memory 130 of FIG. 1), in which case there no need for the telecommunication/IoT device to calculate equation (18).

The following lookup table details the EPCL value for every power control level (PCL) for telecommunications device utilizing the GSM900 or GSM850 frequency band:

| GSM900/850 Power Control Level (PCL) | $10^{(\frac{5-PCL}{10})}$ |
|---|---|
| 5 | 1.00 |
| 6 | 0.79 |
| 7 | 0.63 |
| 8 | 0.50 |
| 9 | 0.40 |
| 10 | 0.32 |
| 11 | 0.25 |
| 12 | 0.20 |
| 13 | 0.16 |
| 14 | 0.13 |
| 15 | 0.10 |
| 16 | 0.08 |
| 17 | 0.06 |
| 18 | 0.05 |
| 19 | 0.04 |

The corresponding fitting equation for the EPCL of a telecommunications device utilizing the DCS1800 or Personal Communications Service ("PCS") 1900 frequency band is, for example:

$$EPCL = 10^{(\frac{-3-PCL}{10})} \quad (19)$$

where PCL is the power level according to the ETSI Power Control Level specification in 3GPP TS 05.05 v.8.20.0 par. 4.1.1.

In some embodiments of the invention, because in DCS and PCS the max power emitted is half of the max power in GSM900, the fitting equation may be manipulated so that the EPCL at max power in DCS/PCS is approximately half of or proportional to the fitting equation of GSM900/850. In this way, the two linear interpolations may approximately coincide and both frequency bands may be represented with a single couple of α and β regardless the frequency band used (e.g., accepting a small error).

The following lookup table details the EPCL value for every power control level (PCL) for telecommunications device utilizing the DCS1800 or PCS1900 frequency band:

| DCS1800/PCS1900 Power Control Level (PCL) | $10^{(\frac{-3-PL}{10})}$ |
|---|---|
| 0 | 0.50 |
| 1 | 0.40 |
| 2 | 0.32 |
| 3 | 0.25 |
| 4 | 0.20 |
| 5 | 0.16 |
| 6 | 0.13 |
| 7 | 0.10 |
| 8 | 0.08 |
| 9 | 0.06 |
| 10 | 0.05 |
| 11 | 0.04 |
| 12 | 0.03 |
| 13 | 0.03 |
| 14 | 0.02 |
| 15 | 0.02 |

A processor (e.g., 120 of FIG. 1) may execute software of firmware in the telecommunications/IoT device to execute an energy counter that, when a transmission timeslot is triggered, may add or increment an energy value by a value of the EPCL associated with the RF power level of the transmission. With this simple way of counting the transmission timeslots, one can obtain a precise integral of the current absorbed and hence easily calculate the charge absorbed and the battery capacity remaining or other useful indicators.

To increase the precision, the power consumption calculation may also be based on the number of reception slots (power consumed by the transceiver during reception may be constant and does not change during transceiver operations), the number of idle slots (power consumed by the transceiver during idle slots is also typically constant), and/or any other slots (e.g., power saving slots).

The processor may use device parameters α and β stored in the memory, tailored to fit the actual consumption curves of the device, to calculate directly the current consumed. α and β may be calculated from the current consumption measures curve to fit the EPCL table, or typical values associated with the device may be used under normal operating conditions e.g., 130 and 1380 for α and β, respectively.

The processor may measure the voltage at the modem or use a fixed device parameter, V, stored in memory to directly compute the energy consumed, e.g., with the equation (7) from the sum of the EPCL.

In some embodiments of the invention, the EPCL may be normalized, e.g., to 1 and 2, at the max power level in DCS1800/PCS1900 and GSM900/850, for example, as follows:

$$GSM900: \quad EPCL = 10^{\frac{8-PCL}{10}}$$

$$GSM850: \quad EPCL = 10^{\frac{8-PCL}{10}}$$

$$GSM1800: \quad EPCL = 10^{\frac{-PCL}{10}}$$

$$GSM1900: \quad EPCL = 10^{\frac{-PCL}{10}}$$

For example, the EPCL for power control level 5 of the GSM900/850 can be normalized to 2 such that the EPCL for power control level 19 of the GSM900/850 would be 0.08. Example results of this are shown in the following tables:

| GSM900/850 Power Levels | Normalized EPCLs |
| --- | --- |
| 5 | 2 |
| 6 | 1.58 |
| 7 | 1.26 |
| 8 | 1 |
| 9 | 0.79 |
| 10 | 0.63 |
| 11 | 0.5 |
| 12 | 0.4 |
| 13 | 0.32 |
| 14 | 0.25 |
| 15 | 0.2 |
| 16 | 0.16 |
| 17 | 0.13 |
| 18 | 0.1 |
| 19 | 0.08 |

| DCS1800/PCS1900 Power Levels | Normalized EPCLs |
| --- | --- |
| 0 | 1 |
| 1 | .0.79 |
| 2 | 0.63 |
| 3 | 0.50 |
| 4 | 0.4 |
| 5 | 0.32 |
| 6 | 0.25 |
| 7 | 0.2 |
| 8 | 0.16 |
| 9 | 0.13 |
| 10 | 0.10 |
| 11 | 0.08 |
| 12 | 0.06 |
| 13 | 0.05 |
| 14 | 0.04 |
| 15 | 0.03 |

Figure 5:
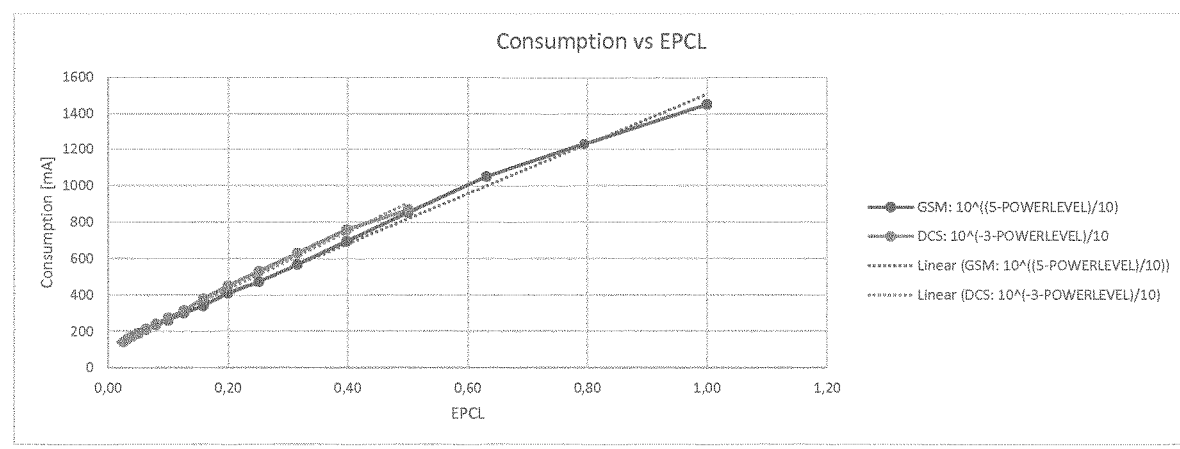
FIG. 5 is a graph of the relationship between peak current consumption and an exponential of the power level (EPCL) of RF power output by a telecommunications transceiver during transmission, according to an embodiment of the invention.

Reference is made to FIG. 5 which is a graph 500 of the relationship between peak current consumption and an exponential of the power level (EPCL) of RF power output by a telecommunications transceiver (e.g., transceiver 90 of FIG. 1) during transmission, according to an embodiment of the invention.

For 2G, a time slot is e.g. 570 μs, so the charge absorbed during transmission may be represented, e.g., as:

$$q_{TX}=(570\ \mu s)*(N*\alpha+\beta*\Sigma\ EPCL) \quad (20)$$

where $q_{TX}$ is the transmission charge and N is the number of time slots during which transmission occurs.

In 3G and 4G, time is typically discretized into frames (or sub-frames) and slots, with the minimum relevant time unit being the slot (e.g., 0.667 ms for 3G and 0.5 ms for 4G). In 4G, time is further discretized into 1 ms subframes. In 3G and 4G, the transmission may be regulated in time either in open loop or closed loop (also referred to as inner loop) with a TPC ("Transmit Power Control") signaling, once per slot (3G) or sub-frame (4G). During a slot/sub-frame, the power output generally remains constant. The use of the EPCL to measure energy consumption applies equally in 3G and 4G, replacing the GSM PCL with the 3G/4G target power or actual power transmitted and the GSM timeslot with the 0.667 ms slot of 3G and the 0.5 ms slot or 1 ms sub-frames of 4G. The charge counter integral may be replaced by the sum of the EPCL multiplied by the 3G slot duration or 4G slot/sub-frame duration (e.g., 0.5 ms/1 ms).

If the receiver is on at the same time as the transmitter, the reception current consumption may be included in the offset of the transmission current and may not be independently taken into account. Further, there is no idling during the LTE transmission, so no idle mode is taken into account. Thus, for 3G and 4G, the charge absorbed during transmission may be represented, e.g., as:

$$q_{TX}=(T\text{slots})*((N*\alpha)+(\beta*\Sigma\ EPCL)) \quad (21)$$

where Tslots is a slot duration (e.g. 0.5 ms), and N is the number of slots during which the device was transmitting.

Figure 6:
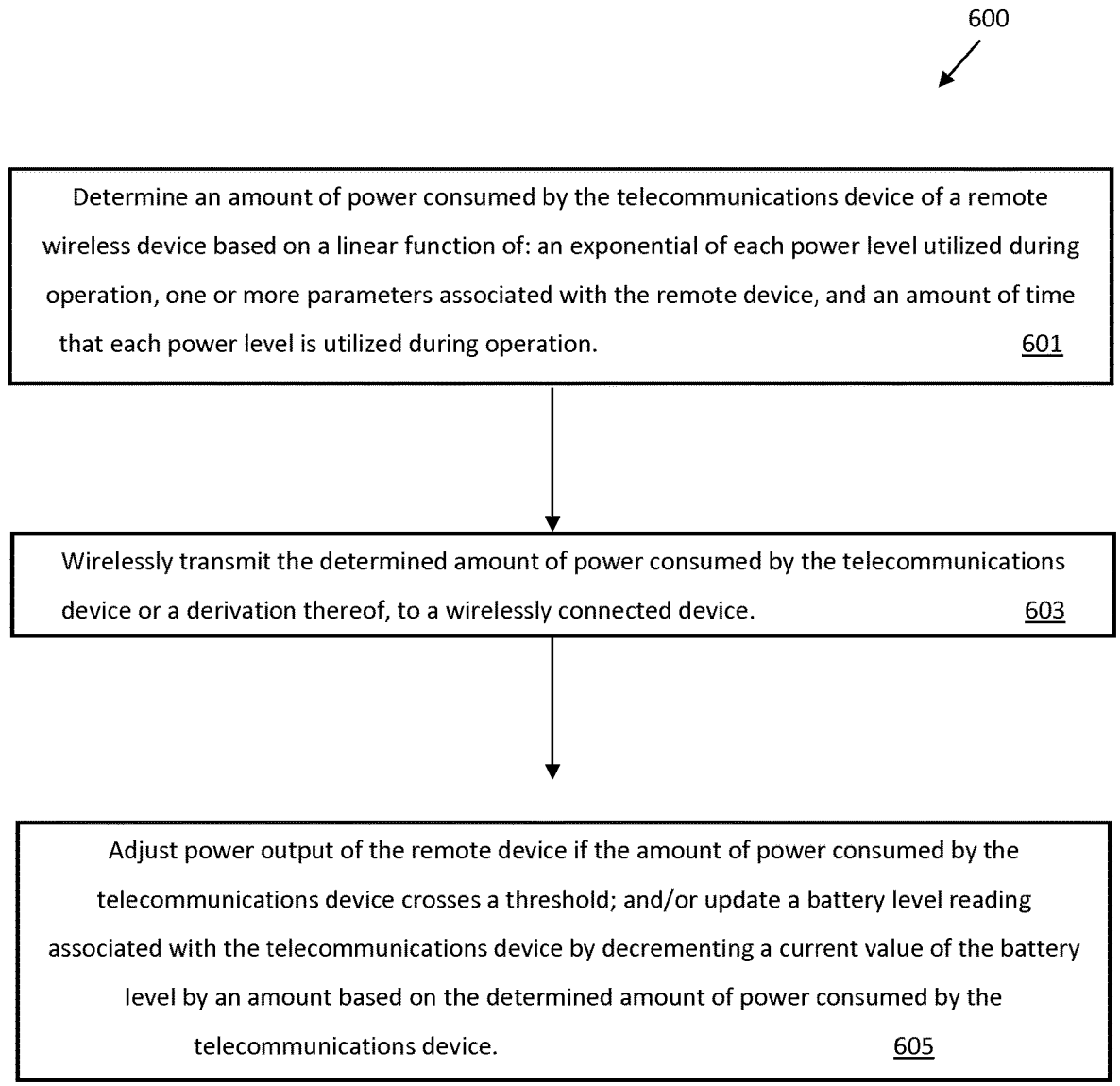
FIG. 6 is a flowchart of a method of operating a fast energy counter for a wireless telecommunications device, according to an embodiment of the invention.

Reference is made to FIG. 6, which is a flowchart of a method 600 of operating a fast energy counter for a wireless telecommunications device, according to an embodiment of the invention. Operations 601-605 may be performed by one or more processors, e.g., 120 of FIG. 1.

In operation 601, a processor (e.g., 120 of FIG. 1) may determine an amount of power consumed by a telecommunications device (e.g., 100 of FIG. 1) of a remote wireless device (e.g., IoT device 80 of FIG. 1) during an operation of the telecommunication device. The processor may determine the amount of power consumed based on a linear function of: an exponential of each power level measuring a radio frequency (RF) power output by the telecommunications device utilized during operation, one or more parameters associated with the remote device, and an amount of time that each power level is utilized during operation.

The power consumption may be determined based on a product of the exponential power level corresponding to the power level(s) utilized by the remote device during operation, the parameters, and the amount of time or number of time intervals that each power level is utilized by the remote device during operation. In some embodiments of the invention, the power consumption may be based on the product multiplied by a scaling factor and summed with a constant biasing factor.

In some embodiments of the invention, a plurality of exponential power levels or derivations thereof for each corresponding one of a plurality of respective available power levels of the telecommunications device may be stored in a look-up table. The amount of power consumed by the telecommunications device may be determined by looking up the exponential power level in the look-up table that corresponds to the power level utilized during operation.

In some embodiments of the invention, the amount of power consumed by the telecommunications device is determined: during only transmission times, during both transmission and reception times, during transmission, reception and idle times, or during transmission, reception, idle and power save times.

In some embodiments of the invention, the power level is a power control level received from a base station over a control channel. In some embodiments of the invention, the power level is incremented or decremented as directed by the network to increase or decrease the power level in fixed increments. In some embodiments of the invention, the power level is adjusted in response to a command for coarse power adjustment and a command for fine power adjustment received from the network.

In operation 603, a processor (e.g., 120 of FIG. 1) may wirelessly transmit the determined amount of power consumed by the telecommunications device or a derivation thereof, to a wirelessly connected device.

In operation 605, a processor (e.g., 120 of FIG. 1) may adjust power output of the remote device (e.g., IoT device 80) in response to determining that the amount of power consumed by the telecommunications device crosses a threshold; and/or may update a battery level reading associated with a battery (e.g., 143 of FIG. 1) of the telecommunications or remote device by decrementing a current value of the battery level by an amount based on the determined amount of power consumed by the telecommunications device.

In the foregoing description, various aspects of the present invention are described. For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A method of managing battery power of a telecommunications device of a remote wireless device, comprising:
    determining an amount of power consumed by the telecommunications device of the remote wireless device during an operation of the telecommunication device based on a linear function of:
        an exponential of a power level measuring a radio frequency (RF) power output by the telecommunications device utilized during operation,
        one or more parameters associated with the remote device, and
        an amount of time that each power level is utilized during operation; and
    wirelessly transmitting the determined amount of power consumed by the telecommunications device or a derivation thereof, to a wirelessly connected device.

2. The method of claim 1 comprising adjusting power output of the remote device in response to determining that the amount of power consumed by the telecommunications device crosses a threshold.

3. The method of claim 1 comprising updating a battery level reading associated with the telecommunications device by decrementing a current value of the battery level by an amount based on the determined amount of power consumed by the telecommunications device.

4. The method of claim 1, wherein the power level is a power control level received from a base station over a control channel.

5. The method of claim 1, wherein the power level is incremented or decremented as directed by the network to increase or decrease the power level in fixed increments.

6. The method of claim 1, wherein the power level is adjusted in response to a command for coarse power adjustment and a command for fine power adjustment received from the network.

7. The method of claim 1 comprising determining the power consumption based on a product of the exponential power level corresponding to the power level utilized by the remote device during operation, the parameters, and the amount of time or number of time intervals that each power level is utilized by the remote device during operation.

8. The method of claim 7 comprising determining the power consumption based on the product multiplied by a scaling factor and summed with a constant biasing factor.

9. The method of claim 1 comprising:
    storing in a look-up table a plurality of exponential power levels or derivations thereof for each corresponding one of a plurality of respective available power levels of the telecommunications device; and
    determining the amount of power consumed by the telecommunications device by looking up the exponential power level in the look-up table that corresponds to the power level utilized during operation.

10. The method of claim 1, comprising determining the amount of power consumed by the telecommunications device during only transmission times, during both transmission and reception times, during transmission, reception and idle times, or during transmission, reception, idle and power save times.

11. A telecommunications device operably connected to a remote wireless device, comprising:
    a processor configured to:
        determine an amount of power consumed by the telecommunications device of the remote wireless device during an operation of the telecommunication device based on a linear function of:
            an exponential of a power level measuring a radio frequency (RF) power output by the telecommunications device utilized during operation,
            one or more parameters associated with the remote device, and
            an amount of time that each power level is utilized during operation; and
    a transmitter configured to wirelessly transmit the determined amount of power consumed by the telecommunications device or a derivation thereof, to a wirelessly connected device.

12. The telecommunications device of claim 11, wherein the processor is configured to adjust power output of the remote device in response to determining that the amount of power consumed by the telecommunications device crosses a threshold.

13. The telecommunications device of claim 11, wherein the processor is configured to update a battery level reading associated with the telecommunications device by decrementing a current value of the battery level by an amount based on the determined amount of power consumed by the telecommunications device.

14. The telecommunications device of claim 11, wherein the power level is a power control level received from a base station over a control channel.

15. The telecommunications device of claim 11, wherein the processor is configured to increment or decrement the power level as directed by the network to increase or decrease the power level in fixed increments.

16. The telecommunications device of claim 11, wherein the processor is configured to adjust the power level in response to a command for coarse power adjustment and a command for fine power adjustment received from the network.

17. The telecommunications device of claim 11, wherein the processor is configured to determine the power consumption based on a product of the exponential power level corresponding to the power level utilized by the remote device during operation, the parameters, and the amount of time or number of time intervals that each power level is utilized by the remote device during operation.

18. The telecommunications device of claim 17, wherein the processor is configured to determine the power consumption based on the product multiplied by a scaling factor and summed with a constant biasing factor.

19. The telecommunications device of claim 17, comprising a memory, wherein the processor is configured to:
   store in the memory a look-up table comprising a plurality of exponential power levels or derivations thereof for each corresponding one of a plurality of respective available power levels of the telecommunications device; and
   determine the amount of power consumed by the telecommunications device by looking up the exponential power level in the look-up table that corresponds to the power level utilized during operation.

20. The telecommunications device of claim 11, wherein the processor is configured to determine the amount of power consumed by the telecommunications device during only transmission times, during both transmission and reception times, during transmission, reception and idle times, or during transmission, reception, idle and power save times.

* * * * *